(12) United States Patent
Yamane et al.

(10) Patent No.: US 11,285,449 B2
(45) Date of Patent: Mar. 29, 2022

(54) METHOD FOR PRODUCING SEALANT

(71) Applicants: MITSUBISHI HEAVY INDUSTRIES, LTD., Tokyo (JP); KAGA SANGYO CO., LTD., Nagoya (JP); KAGA WORKS CO., LTD., Iida (JP)

(72) Inventors: Shigemi Yamane, Tokyo (JP); Osamu Mizoguchi, Nagoya (JP); Hitoshi Tsujikawa, Nagoya (JP)

(73) Assignees: MITSUBISHI HEAVY INDUSTRIES, LTD., Tokyo (JP); KAGA SANGYO CO., LTD., Nagoya (JP); KAGA WORKS CO., LTD., Iida (JP)

( * ) Notice: Subject to any disclaimer, the term of this patent is extended or adjusted under 35 U.S.C. 154(b) by 264 days.

(21) Appl. No.: 16/497,950

(22) PCT Filed: Mar. 22, 2018

(86) PCT No.: PCT/JP2018/011468
§ 371 (c)(1),
(2) Date: Sep. 26, 2019

(87) PCT Pub. No.: WO2018/180906
PCT Pub. Date: Oct. 4, 2018

(65) Prior Publication Data
US 2020/0316539 A1  Oct. 8, 2020

(30) Foreign Application Priority Data

Mar. 31, 2017 (JP) .............................. JP2017-072113

(51) Int. Cl.
*B01F 7/30* (2006.01)
*B01F 3/12* (2006.01)
(Continued)

(52) U.S. Cl.
CPC .............. *B01F 7/30* (2013.01); *B01F 3/1214* (2013.01); *B01F 3/2021* (2013.01);
(Continued)

(58) Field of Classification Search
CPC ........ B01F 15/00993; B01F 2215/0036; B01F 3/1214; B01F 3/2223; B01F 3/2269;
(Continued)

(56) References Cited

U.S. PATENT DOCUMENTS 6,994,464 B2 * 2/2006 Villwock ........... B01D 19/0052
366/136
8,092,075 B2 * 1/2012 Ishii ........................ B29B 7/106
366/139

(Continued)

FOREIGN PATENT DOCUMENTS

EP  3511143 A1 * 7/2019 ............. B29C 39/42
JP  2002-096021 A  4/2002
(Continued)

OTHER PUBLICATIONS

PCT/ISA/210, "International Search Report for International Application No. PCT/JP2018/011468," dated May 1, 2018.
(Continued)

*Primary Examiner* — Tony G Soohoo
(74) *Attorney, Agent, or Firm* — Manabu Kanesaka; Benjamin Hauptman; Kenneth Berner (57) ABSTRACT

A method for producing a sealant includes a weighing and mixing step, a kneading step, a stirring and defoaming step, and a filling step. In the weighing and mixing step, a main component and a curing agent are weighed and mixed together. In the kneading step, the mixture mixed in the weighing and mixing step is kneaded. In the stirring and defoaming step, the kneaded product kneaded in the kneading step is stirred and defoamed. In the filling step, the
(Continued)

kneaded product defoamed in the stirring and defoaming step is filled into a container. In the stirring and defoaming step, the kneaded product is stirred under a condition wherein a stirring rotational speed at which the kneaded product is stirred and a stirring time for which the kneaded product is stirred are within a range from an arithmetic product lower limit value to an arithmetic product upper limit value.

15 Claims, 4 Drawing Sheets

(51) Int. Cl.
*B01F 3/22* (2006.01)
*B01F 15/00* (2006.01)
*B65B 3/12* (2006.01)
*B01F 3/20* (2006.01)
*C01G 45/02* (2006.01)

(52) U.S. Cl.
CPC .......... *B01F 3/2223* (2013.01); *B01F 3/2269* (2013.01); *B01F 15/00993* (2013.01); *B65B 3/12* (2013.01); *B01F 2215/0036* (2013.01); *B01F 2215/0409* (2013.01); *B01F 2215/0477* (2013.01); *B01F 2215/0481* (2013.01); *C01G 45/02* (2013.01)

(58) Field of Classification Search
CPC . B01F 7/30; B29B 7/005; B29B 7/106; B29B 7/244; B29B 7/826; B29B 7/845; B01D 19/0052; B01D 19/02; B65B 3/04; B65B 3/12; C01G 45/02; C09K 3/1006
See application file for complete search history.

(56) References Cited

U.S. PATENT DOCUMENTS

| 8,425,824 | B2* | 4/2013 | Ishibashi | B01D 63/022 264/257 |
| 8,534,906 | B2* | 9/2013 | Harada | B29B 7/845 366/139 |
| 8,617,453 | B2* | 12/2013 | Mizoguchi | B29C 45/14065 264/503 |
| 9,044,717 | B2* | 6/2015 | Yao | B01F 9/0001 |
| 9,126,702 | B2 | 9/2015 | Mizoguchi et al. | |
| 2006/0104156 | A1* | 5/2006 | Villwock | B01F 15/00837 366/184 |
| 2009/0281663 | A1* | 11/2009 | Robida | B01F 9/0001 700/265 |
| 2010/0044908 | A1* | 2/2010 | Ishibashi | B01D 63/02 264/171.12 |
| 2010/0265791 | A1* | 10/2010 | Ishii | B01D 19/0052 366/223 |
| 2012/0121809 | A1* | 5/2012 | Vuozzo | A01N 59/14 427/317 |
| 2012/0205001 | A1 | 8/2012 | Mizoguchi et al. | |
| 2020/0001520 | A1* | 1/2020 | Lootens | B29C 64/386 |
| 2020/0316539 | A1* | 10/2020 | Yamane | B65B 3/12 |

FOREIGN PATENT DOCUMENTS

| JP | 2006-263691 | A | 10/2006 | |
| JP | 3860770 | B2 | 12/2006 | |
| JP | 4659128 | B2 | 3/2011 | |
| JP | 2011-224837 | A | 11/2011 | |
| JP | 2012-045444 | A | 3/2012 | |
| JP | 2014-088031 | A | 5/2014 | |
| JP | 2015-016403 | A | 1/2015 | |
| JP | 2015-028384 | A | 2/2015 | |
| JP | 2015-167942 | A | 9/2015 | |
| WO | WO-2011129449 | A1 * | 10/2011 | ............. B29C 39/42 |
| WO | WO-2018180906 | A1 * | 10/2018 | ............. B29B 7/244 |

OTHER PUBLICATIONS

PCT/ISA/237, "Written Opinion of the International Searching Authority for International Application No. PCT/JP2018/011468," dated May 1, 2018.

* cited by examiner

METHOD FOR PRODUCING SEALANT

TECHNICAL FIELD

The present invention relates to a method for producing a sealant.

Priority is claimed on Japanese Patent Application No. 2017-072113, filed Mar. 31, 2017, the content of which is incorporated herein by reference.

BACKGROUND ART

In 2-liquid sealants used for aircraft structural members and the like, stirring and defoaming may be performed during production in order to prevent the effects of corrosion, fuel leakage, and lightening due to voids formed by air bubbles contained in the sealants.

Patent Literature 1 discloses a technology that causes a container to revolve around a revolution axis and rotate around a rotation axis as a stirring and defoaming device.

Patent Literature 2 discloses that, when a viscous material is stirred and defoamed, there is a trade-off relationship between void conditions and viscous material temperature conditions. Patent Literature 2 also discloses that the viscous material is heated due to Joule heat as the stirring time becomes longer.

CITATION LIST

Patent Literature

[Patent Literature 1]
Japanese Patent No. 3860770
[Patent Literature 2]
Japanese Patent No. 4659128

SUMMARY OF INVENTION

Technical Problem

The above sealant may be filled into a container such as a syringe and stored in a frozen state and thawed for use. It is required that a discharge amount per unit time from the container be maintained for this frozen and stored sealant for about 2 hours after thawing at a specific value or more (discharging ability).

In the above sealant, it is desirable to improve mass productivity while satisfying void conditions and temperature conditions. However, the inventors conducted studies and found that, when an amount of stirring at one time is high, a trade-off relationship between void conditions and temperature conditions described in Patent Literature 2 is not established, and it may not be possible to satisfy both void conditions and temperature conditions.

The present invention provides a method for producing a sealant through which it is possible to improve mass productivity while maintaining a void removal ability and a discharging ability.

Solution to Problem

According to a first aspect of the present invention, a method for producing a sealant includes a weighing and mixing step, a kneading step, a stirring and defoaming step, and a filling step. In the weighing and mixing step, a main component and a curing agent are weighed out and mixed together. In the kneading step, the mixture mixed in the weighing and mixing step is kneaded. In the stirring and defoaming step, the kneaded product kneaded in the kneading step is stirred and defoamed. In the filling step, the kneaded product defoamed in the stirring and defoaming step is filled into a container. In the stirring and defoaming step, the kneaded product is stirred under a condition in which an arithmetic product of a stirring rotational speed at which the kneaded product is stirred and a stirring time for which the kneaded product is stirred is within a range from an arithmetic product lower limit value to an arithmetic product upper limit value that are predetermined according to a stirring amount of the kneaded product.

In such a configuration, the kneaded product can be stirred and defoamed only under a condition in which an arithmetic product of the stirring rotational speed and the stirring time falls within a range from an arithmetic product lower limit value to an arithmetic product upper limit value that are predetermined according to the stirring amount. Therefore, it is possible to increase the stirring amount while satisfying respective conditions of the arithmetic product lower limit value and the arithmetic product upper limit value.

According to a second aspect of the present invention, the arithmetic product lower limit value and the arithmetic product upper limit value according to the first aspect may be set so that the stirring time is within a range from an upper limit value to a lower limit value of the preset stirring time.

If the stirring time is too long, curing of the kneaded product proceeds regardless of the stirring rotational speed, and if the stirring time is too short, defoaming does not proceed regardless of the stirring rotational speed. However, in the above configuration, it is possible to prevent a void removal ability and a discharging ability from deteriorating.

According to a third aspect of the present invention, in the method for producing a sealant according to the second aspect, the upper limit value of the stirring time may be 3 minutes, and the lower limit value of the stirring time may be 0.5 minutes.

In such a configuration, it is possible to prevent a void removal ability and a discharging ability from deteriorating while improving mass productivity.

According to a fourth aspect of the present invention, in the method for producing a sealant according to any one of the first to third aspects, the stirring amount of the kneaded product may be 270 g to 370 g, the stirring rotational speed may be 700 rpm, and the stirring time may be 120 seconds.

In such a configuration, when the stirring amount is 270 g to 370 g, it is possible to maintain the discharging ability of the sealant for about 120 minutes while preventing voids from being mixed into the sealant.

According to a fifth aspect of the present invention, in the stirring and defoaming step according to any one of the first to fourth aspects, stirring may be performed by setting the temperature of the kneaded product kneaded in the weighing and mixing step to 10 degrees to 32 degrees Celsius.

In such a configuration, it is possible to stably remove voids and secure the discharging ability during use.

According to a sixth aspect of the present invention, the method for producing a sealant according to any one of the first to fifth aspects may include a freezing step in which the kneaded product filled into the container is frozen.

The kneaded product filled into the container that is frozen can be stored. Therefore, it is possible to maintain the void removal ability and the discharging ability even if the kneaded product is thawed and used.

Advantageous Effects of Invention

According to the method for producing a sealant, it is possible to improve mass productivity while maintaining a void removal ability and a discharging ability.

DESCRIPTION OF EMBODIMENTS

Next, a method for producing a sealant according to an embodiment of the present invention will be described with reference to the drawings.

Figure 1:
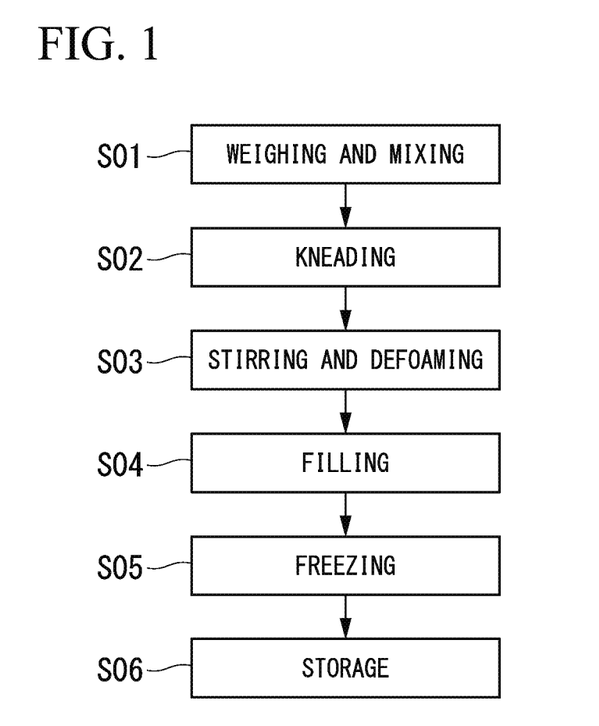
FIG. 1 is a flowchart showing a method for producing a sealant according to an embodiment.

FIG. 1 is a flowchart showing a method for producing a sealant according to an embodiment.

As shown in FIG. 1, the method for producing a sealant exemplified in the embodiment includes a weighing and mixing step S01, a kneading step S02, a stirring and defoaming step S03, a filling step S04, a freezing step S05, and a storage step S06. The sealant exemplified in the embodiment is, for example, a non-conductive 2-liquid mixed type (2-liquid) sealant used for an aircraft structural member.

In the weighing and mixing step S01, a main component and a curing agent constituting a 2-liquid sealant are weighed out at default proportions and mixed together.

Manganese dioxide can be used as the main component. In addition, ethyl acetate or toluene can be used as the curing agent.

In the kneading step S02, the mixture mixed in the weighing and mixing step S01 is kneaded. In the kneading step, the main component and the curing agent are kneaded so that they are sufficiently mixed.

In the stirring and defoaming step S03, the kneaded product kneaded in the kneading step S02 is stirred and defoamed (stirred and defoamed). Stirring and defoaming performed in the stirring and defoaming step S03 of the embodiment can be performed using a stirring and defoaming device that can rotate and revolve a container in which a kneaded product is accommodated.

In the stirring and defoaming step S03, the kneaded product is stirred based on a value obtained by multiplying a stirring rotational speed at which the kneaded product is stirred by a stirring time for which the kneaded product is stirred (hereinafter simply referred to as a product) and a stirring amount of the kneaded product. More specifically, the kneaded product is stirred under a condition in which an arithmetic product of the stirring rotational speed and the stirring time is within a range from an arithmetic product lower limit value to an arithmetic product upper limit value that are predetermined according to the stirring amount. The stirring rotational speed in the embodiment is a rotational speed at which the container is revolved by the above stirring and defoaming device.

Figure 2:
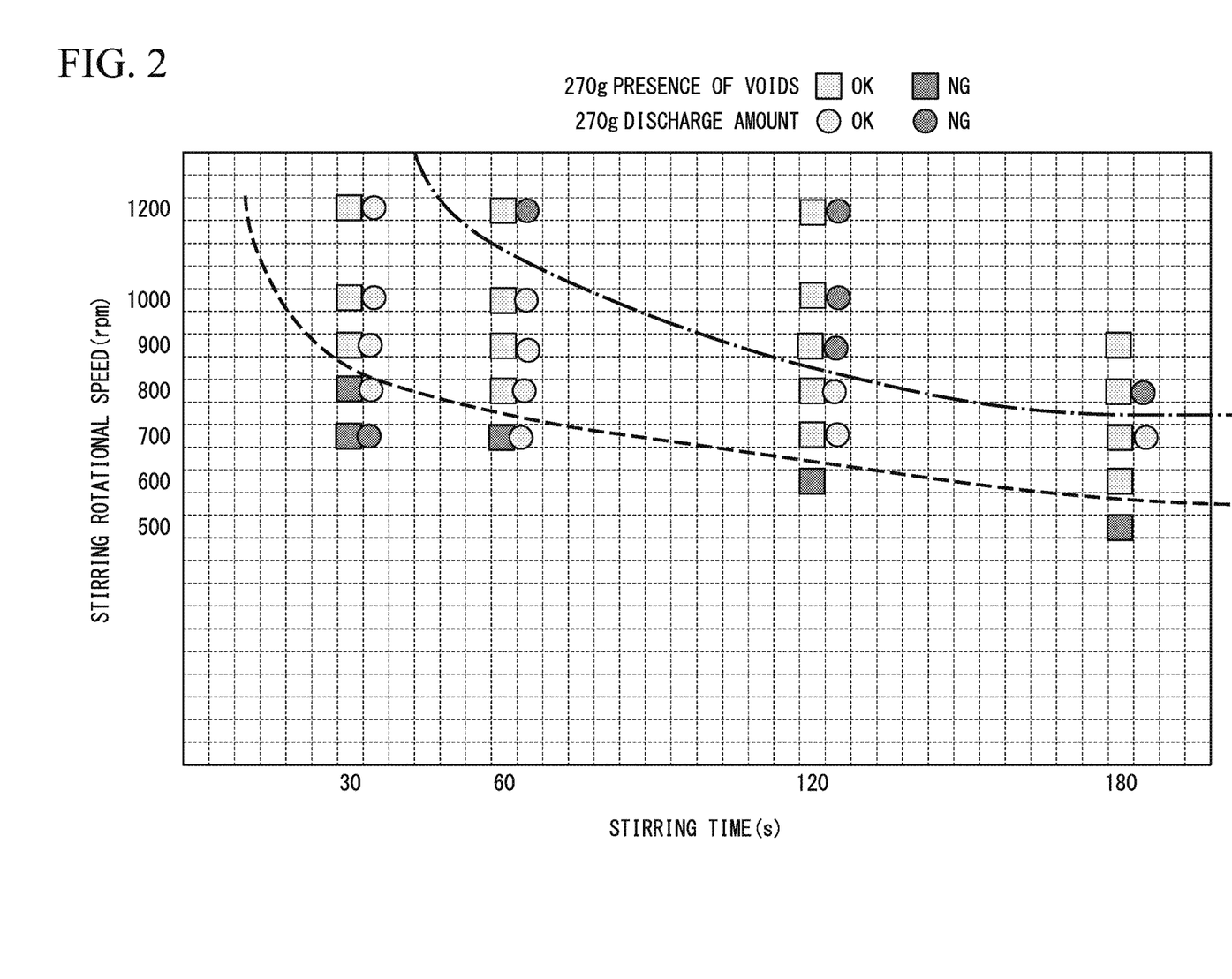
FIG. 2 is a graph in which the vertical axis represents a stirring rotational speed (rpm) and the horizontal axis represents a stirring time (s) and which shows evaluation results of the presence of voids and the discharge amount when the stirring amount is 270 g.
Figure 3:
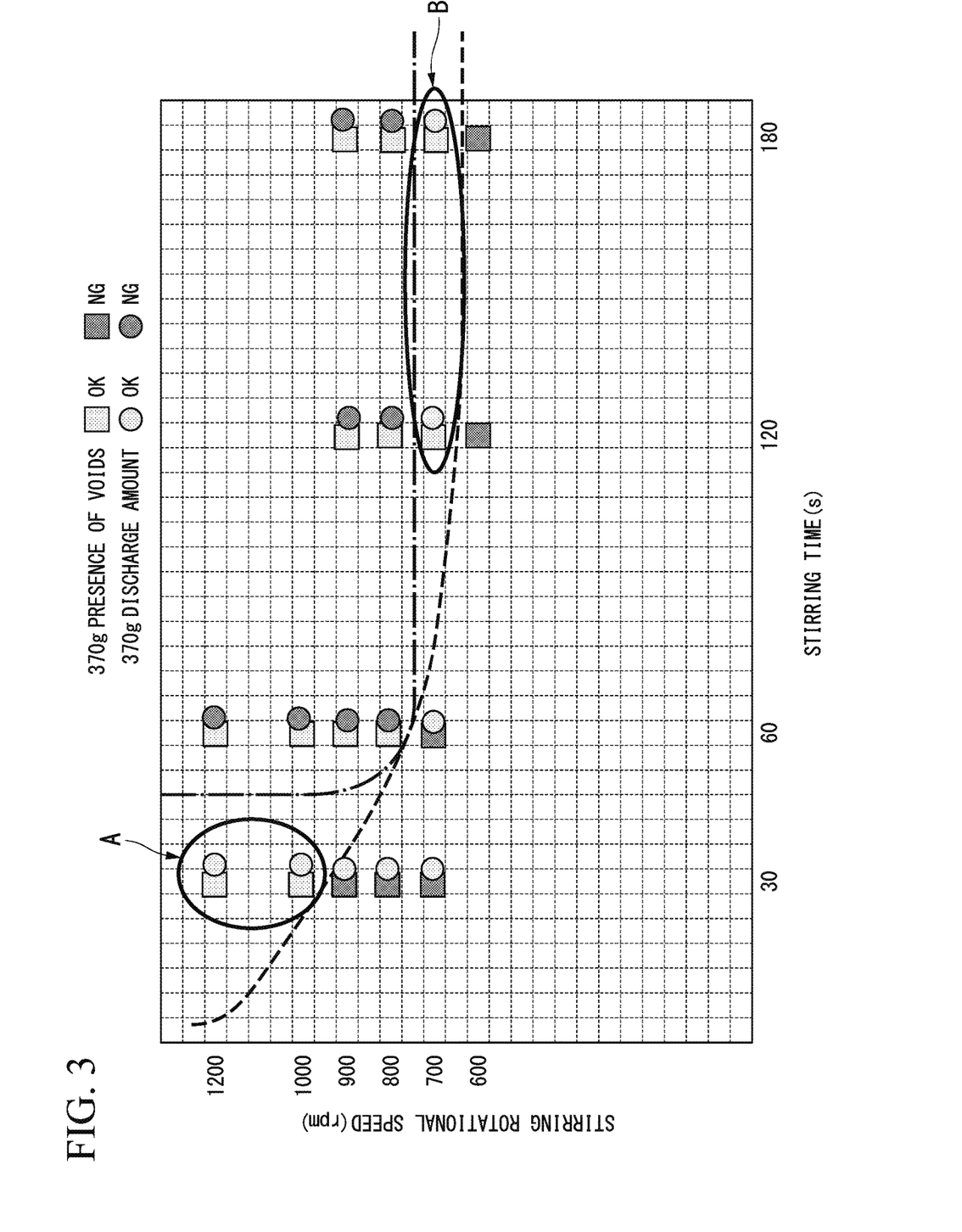
FIG. 3 is a graph in which the vertical axis represents a stirring rotational speed (rpm) and the horizontal axis represents a stirring time (s) and which shows evaluation results of the presence of voids and the discharge amount when the stirring amount is 370 g.
Figure 4:
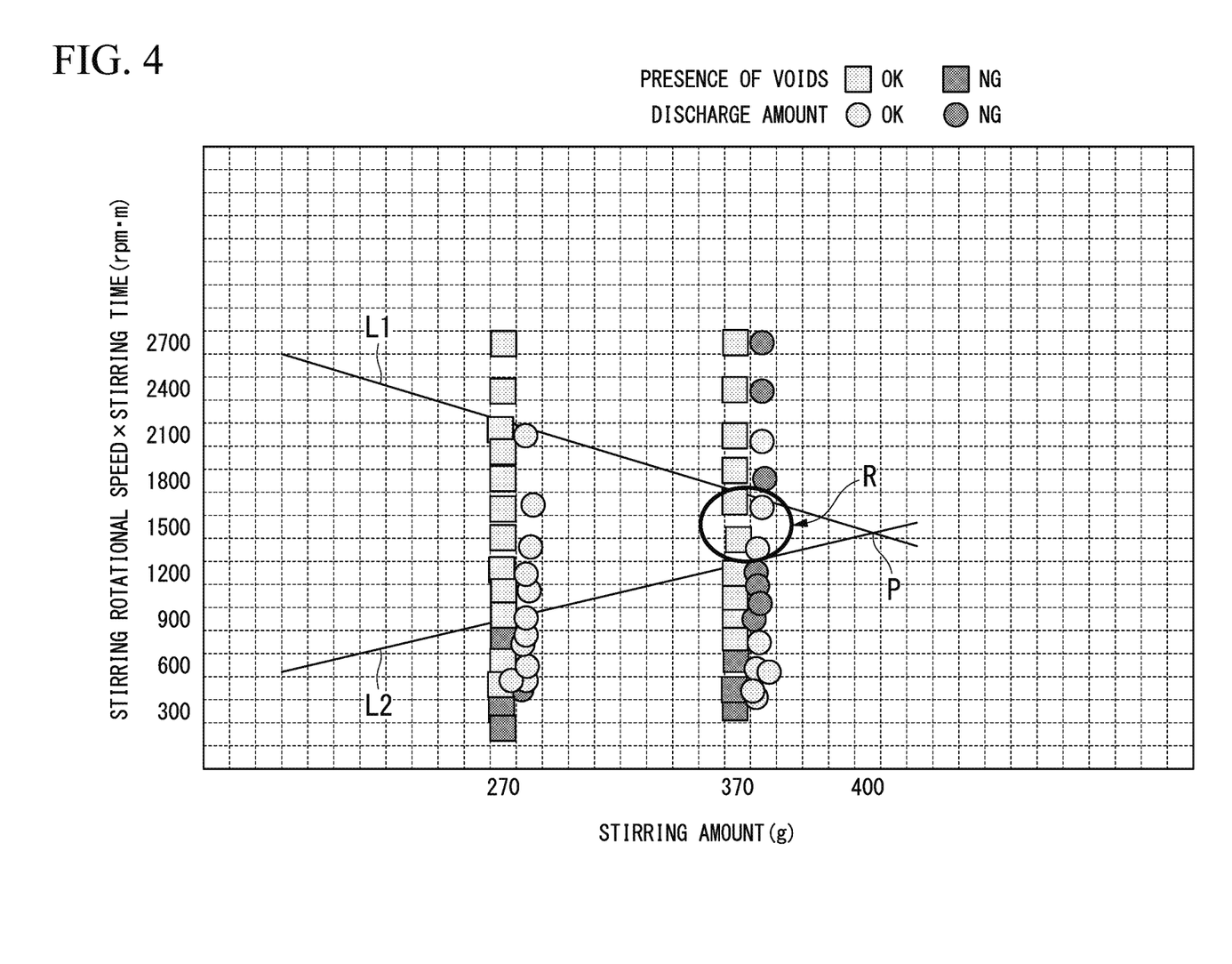
FIG. 4 is a graph in which the vertical axis represents an arithmetic product of a stirring rotational speed (rpm) and a stirring time (s) and the horizontal axis presents a stirring amount (g) and which shows evaluation results of the presence of voids and the discharge amount.

FIG. 2 is a graph in which the vertical axis represents a stirring rotational speed (rpm) and the horizontal axis represents a stirring time (s) and which shows evaluation results of the presence of voids and the discharge amount when the stirring amount is 270 g. FIG. 3 is a graph in which the vertical axis represents a stirring rotational speed (rpm) and the horizontal axis represents a stirring time (s) and which shows evaluation results of the presence of voids and the discharge amount when the stirring amount is 370 g. FIG. 4 is a graph in which the vertical axis represents an arithmetic product of a stirring rotational speed (rpm) and a stirring time (s) and the horizontal axis represents a stirring amount (g) and which shows evaluation results of the presence of voids and the discharge amount. The voids referred to here are, for example, those having a diameter of 0.2 mm or more.

In FIG. 2 to FIG. 4, light shaded rectangles indicate that voids are removed (OK) and dark shaded rectangles indicate that voids are not removed (NG). In addition, in FIG. 2 to FIG. 4, light shaded circles indicate that the discharge amount is favorable (OK) and dark shaded circles indicate that the discharge amount is not favorable (NG). That is, it is preferable that the stirring and defoaming step S03 be performed so that both the rectangles and the circles in FIG. 2 to FIG. 4 are within ranges of the stirring rotational speed and the stirring time so that they are light shaded.

The dashed line shown in FIG. 2 indicates a lower limit value at which voids can be removed when the stirring amount is 270 (g). As shown in FIG. 2, if the stirring time is 30, 60, 120, or 180 (s), voids in the kneaded product are removed when the stirring rotational speed (rpm) is a rotational speed higher than a void removal lower limit value line (dashed line). Regarding the void removal lower limit value, the stirring rotational speed is higher when the stirring time is shorter, and the stirring rotational speed is lower when the stirring time becomes longer. The void removal lower limit value line is curved such that a rate of increase of the stirring rotational speed increases when the stirring time is shorter.

The dashed line shown in FIG. 2 indicates a curing progress upper limit value when the stirring amount is 270 (g). As shown in FIG. 2, if the stirring time is 30, 60, 120, or 180 (s), the discharging ability of the kneaded product is favorable when the stirring rotational speed is a rotational speed lower than the curing progress upper limit value. Regarding the curing progress upper limit value, the stirring rotational speed is higher when the stirring time is shorter and the stirring rotational speed is lower when the stirring time becomes longer. In this regard, the curing progress upper limit value shows the same trend as the above void removal lower limit value, but at the same stirring time, the curing progress upper limit value is a value with a stirring rotational speed higher than the void removal lower limit value. The curing progress upper limit value line can be shown in a curve similar to that of the void removal lower limit value. In FIG. 2, an area with a void removal lower limit value or more and a curing progress upper limit value or less is continuous from a short stirring time to a long stirring time.

The dashed line shown in FIG. 3 indicates a void removal lower limit value when the stirring amount is 370 (g). As shown in FIG. 3, when the stirring time is 30, 60, 120, or 180 (s), voids are removed when the stirring rotational speed is higher than a void removal lower limit value line. Regarding the void removal lower limit value, the stirring rotational speed is higher when the stirring time is shorter and the stirring rotational speed is lower when the stirring time becomes longer. The void removal lower limit value line is curved such that a rate of increase of the stirring rotational speed increases when the stirring time is shorter.

The dashed line shown in FIG. 3 indicates a curing progress upper limit value when the stirring amount is 370 (g). As shown in FIG. 3, if the stirring time is 30, 60, 120, or 180 (s), the discharging ability is favorable when the stirring rotational speed is a rotational speed lower than the curing progress upper limit value. The curing progress upper limit value rapidly increases from 60 seconds to 30 seconds when the stirring time is between 60 seconds and 30 seconds.

The curing progress upper limit value line crosses the void removal lower limit value line when the stirring time is between 30 seconds and 60 seconds. More specifically, in an area in which the stirring time is between 30 seconds and 60 seconds, the void removal lower limit value and the curing progress upper limit value may be the same. That is, when the void removal lower limit value and the curing progress upper limit value are the same, voids are removed and there is no area in which the discharge amount is favorable. In other words, it can be understood that, when the void removal lower limit value and the curing progress upper limit value are the same, the stirring rotational speed and the stirring time (temperature) are not in a trade-off relationship. The curing progress upper limit value in the embodiment converges at about 750 (rpm) when the stirring time exceeds 60 seconds.

As shown in FIG. 3, when the stirring time exceeds 60 seconds, the void removal lower limit value line is below the curing progress line. Between the void removal lower limit value line and the curing progress line, voids in the kneaded product are removed, and an area in which the discharge amount is favorable is formed.

Since the stirring amount of 370 (g) that is handled at one time in the stirring and defoaming step S03 is larger than 270 (g), the mass productivity of the sealant is favorable. Regardless of the stirring time, when the stirring rotational speed is lower, a load on the stirring and defoaming device decreases. Therefore, even if the stirring time becomes longer, it is possible to improve the mass productivity of the sealant by lowering the stirring rotational speed. In the method for producing a sealant of the embodiment, the mass productivity is determined with two parameters including the stirring amount and the stirring rotational speed. For example, in FIG. 3, in an area indicated by "A," voids are removed and the discharge amount is favorable, but since the stirring rotational speed is high, this area is not used in consideration of the mass productivity, and only an area indicated by "B" in FIG. 3 is used.

As shown in the graph in FIG. 4, when the stirring amount is 270 g, voids are removed and a lower limit value of an arithmetic product of a stirring rotational speed and stirring time at which the discharge amount is favorable (hereinafter simply referred to as an arithmetic product lower limit value) is 900 (rpm·m). When the stirring amount is 270 g, voids are removed and an upper limit value of an arithmetic product of a stirring rotational speed and stirring time at which the discharge amount is favorable (hereinafter simply referred to as an arithmetic product upper limit value) is 2,100 (rpm·m).

When the stirring amount is 370 g, voids are removed and the arithmetic product lower limit value at which the discharge amount is favorable is about 1,400 (rpm·m). When the stirring amount is 370 g, voids are removed and the arithmetic product upper limit value at which the discharge amount is favorable is 1,600 (rpm·m).

When the stirring amount shown in FIG. 4 is 370 g, in an area exceeding the arithmetic product upper limit value, voids are removed and there is data in which the discharge amount is favorable. However, this data is data in which the stirring time exceeds 120 seconds. In this manner, when the stirring time exceeds 120 seconds, the results of the discharge amount are both favorable and defective, and therefore unstable. Therefore, data with a stirring time of longer than 120 seconds is excluded. That is, regarding the arithmetic product upper limit value when the stirring amount is 370 g, the upper limit value of the stirring time is set to 120 seconds.

When the stirring amount shown in FIG. 4 is 370 g, also in an area below the arithmetic product lower limit value, voids are removed and there is data in which the discharge amount is favorable. However, this data is data when the stirring time is 30 seconds and the stirring rotational speed is relatively high. Therefore, in this manner, regarding the stirring time, data with a stirring time of shorter than 60 seconds is excluded in consideration of the increase in the load on the above stirring and defoaming device (in other words, mass productivity). That is, regarding the arithmetic product lower limit value when the stirring amount is 370 g, the lower limit value of the stirring time is set to 60 seconds.

An arithmetic product upper limit value line L1 shown in FIG. 4 can be obtained from the arithmetic product upper limit value in a plurality of stirring amounts (270 g and 370 g). The line L1 is a straight line that passes through respective arithmetic product upper limit values of the plurality of stirring amounts (270 g and 370 g) and descends rightward as the stirring amount increases.

Similarly, an arithmetic product lower limit value line L2 shown in FIG. 4 can be obtained from the arithmetic product lower limit value in a plurality of stirring amounts (270 g and 370 g). The line L2 is a straight line that passes through respective arithmetic product lower limit values of the plurality of stirring amounts (270 g and 370 g) and ascends rightward as the stirring amount increases.

In the embodiment, these line L1 and line L2 cross each other in the vicinity of a point at which the stirring amount is 400 g, and an arithmetic product of the stirring rotational speed and the stirring time is 1,500 rpm·m. That is, an area from the line L1 to the line L2 tapers as the stirring amount increases. In the area from the line L1 to the line L2, toward an intersection point P of the line L1 and the line L2, it is possible to improve the mass productivity in consideration of the stirring amount (in FIG. 4, mass productivity optimal condition area R). In an area in which the stirring amount is larger than that of the intersection point of the arithmetic product upper limit value line L1 and the arithmetic product lower limit value line L2, basically, at least one of a void removal failure and a discharging ability failure appears.

In the filling step S04, the kneaded product that is stirred and defoamed in the stirring and defoaming step S03 is filled into a storage container (in other words, a cartridge) such as a syringe. In the filling step, in order to prevent air bubbles from being mixed in, the product may be filled into an evacuated chamber or the like.

In the freezing step S05, the storage container into which the kneaded product is filled in the filling step S04 is, for example, rapidly frozen with a refrigerant such as liquid nitrogen (for example, at about −70 degrees Celsius).

In the storage step S06, the storage container containing the kneaded product frozen in the freezing step S05 is stored in a freezer or the like (for example, at about −50 degrees Celsius).

The frozen kneaded product stored in the storage step S06 that is filled into the storage container is thawed in warm water or at room temperature before use. The storage container in which the kneaded product is thawed is loaded into a caulking gun or the like. The kneaded product in the storage container is pressurized by a piston of the caulking gun or the like. Therefore, the thawed kneaded product is discharged from a nozzle outlet of the caulking gun or the like as a sealant.

According to the above embodiment, the kneaded product can be stirred and defoamed only under a condition in which an arithmetic product of the stirring rotational speed and the stirring time in the stirring and defoaming step S03 falls within a range from an arithmetic product lower limit value to an arithmetic product upper limit value that are predetermined according to the stirring amount. Therefore, it is possible to increase the stirring amount while satisfying respective conditions of the arithmetic product lower limit value and the arithmetic product upper limit value.

If the stirring time is too long, curing of the kneaded product proceeds regardless of the stirring rotational speed, and if the stirring time is too short, defoaming does not proceed regardless of the stirring rotational speed. However, when the stirring time is set between the upper limit value and the lower limit value as described above, it is possible to exclude conditions by which the void removal ability and the discharging ability deteriorate.

When the temperature of the kneaded product is set to 10 degrees to 32 degrees Celsius, since reproducibility can be secured, it is possible to remove voids stably and secure the discharging ability.

Since the storage container into which the kneaded product is filled is frozen and stored, it is possible to maintain the void removal ability and the discharging ability even if the kneaded product is thawed and used.

EXAMPLES

Next, examples according to the above method for producing a sealant will be described.

Example 1

245 g of manganese dioxide as a main component and 25 g of ethyl acetate as a curing agent were mixed (mixing ratio 10:1) to prepare 270 g of a mixture so that an arithmetic product of the stirring rotational speed and the stirring time falls within an area from the curing progress upper limit value line L1 to the void removal lower limit value line L2 in FIG. 4 and the stirring amount was as large as possible.

Then, immediately, kneading of the mixture was started. The kneading was performed by a kneading device at a rotational speed of 30 rpm for 10 minutes.

After the kneading, the kneaded product was transferred into a container of a stirring and defoaming device (ARV930TWJN commercially available from Thinky Corporation) and stirred and defoamed. In the stirring and defoaming device, a stirring rotational speed was set to 700 rpm and a stirring time was set to 120 seconds. The above operations were performed by setting the room temperature to 22 degrees Celsius. The temperature of the kneaded product when the kneading started was the same as the room temperature.

Then, the stirred and defoamed kneaded product was removed from the stirring and defoaming device and filled into the storage container by a filling device (Japanese Patent No. 4659128, commercially available from Kaga Sangyo Co., Ltd.). 135 g of the stirred and defoamed kneaded product was filled into one storage container.

The kneaded product filled into the storage container was rapidly frozen at −70 degrees Celsius by a rapid freezing machine.

Then, the storage container containing the rapidly frozen kneaded product was stored at −50 degrees Celsius in a freezer (15 hours).

Next, during a sealing operation, the storage container was removed from the freezer and the kneaded product in the storage container at the above room temperature was thawed. Then, a predetermined pressure was applied to the kneaded product in the storage container, the kneaded product in the storage container was discharged every 30 minutes, and a discharge amount per unit time in this case was measured.

Example 2

336 g of manganese dioxide as a main component and 34 g of ethyl acetate as a curing agent were mixed to prepare 370 g of a mixture so that an arithmetic product of the stirring rotational speed and the stirring time falls within an area from the line L1 to the line L2 shown in FIG. 4 and the stirring amount was as large as possible.

Then, immediately, kneading of the mixture was started. The kneading was performed by a kneading device at a rotational speed of 30 rpm for 10 minutes. After the kneading, the kneaded product was transferred into a container of a stirring and defoaming device (ARV930TWIN commercially available from Thinky Corporation) and stirred and defoamed. In the stirring and defoaming device, a stirring rotational speed was set to 750 rpm and a stirring time was set to 120 seconds. The above operations were performed by setting the room temperature to 22 degrees Celsius. The temperature of the kneaded product when the kneading started was the same as the room temperature.

Then, the stirred and defoamed kneaded product was removed from the stirring and defoaming device and filled into the storage container by a filling device (Japanese Patent No. 4659128, commercially available from Kaga Sangyo Co., Ltd.). 135 g of the stirred and defoamed kneaded product was filled into one storage container.

The kneaded product filled into the storage container was rapidly frozen at −70 degrees Celsius by a rapid freezing machine.

The storage container containing the rapidly frozen kneaded product was stored at −50 degrees Celsius in a freezer (15 hours).

Next, after a predetermined time had passed, the storage container was removed from the freezer, and the kneaded product in the storage container at the above room temperature was thawed. Then, a predetermined pressure was applied to the kneaded product in the storage container, the kneaded product in the storage container was discharged every 30 minutes, and a discharge amount per unit time in this case was measured.

Comparative Example 1

336 g of manganese dioxide as a main component and 34 g of ethyl acetate as a curing agent were mixed to prepare 370 g of a mixture.

Then, immediately, kneading of the mixture was started. The kneading was performed by a kneading device at a rotational speed of 30 rpm for 10 minutes.

After the kneading, the kneaded product was transferred into a container of a stirring and defoaming device (ARV930TWIN commercially available from Thinky Corporation) and stirred and defoamed. In the stirring and defoaming device, a stirring rotational speed was set to 700 rpm and a stirring time was set to 60 seconds. The above operations were performed by setting the room temperature to 22 degrees Celsius. The temperature of the kneaded product when the kneading started was the same as the room temperature.

Then, the stirred and defoamed kneaded product was removed from the stirring and defoaming device and filled into the storage container by a filling device (Japanese Patent No. 4659128, commercially available from Kaga Sangyo Co., Ltd.). 135 g of the stirred and defoamed kneaded product was filled into one storage container.

The kneaded product filled into the storage container was rapidly frozen at −70 degrees Celsius by a rapid freezing machine.

The storage container containing the rapidly frozen kneaded product was stored at −50 degrees Celsius in a freezer (15 hours).

Comparative Example 2

336 g of manganese dioxide as a main component and 34 g of ethyl acetate as a curing agent were mixed to prepare 370 g of a mixture.

Then, immediately, kneading of the mixture was started. The kneading was performed by a kneading device at a rotational speed of 30 rpm for 10 minutes.

After the kneading, the kneaded product was transferred into a container of a stirring and defoaming device (ARV930TWIN commercially available from Thinky Corporation) and stirred and defoamed. In the stirring and defoaming device, a stirring rotational speed was set to 700 rpm and a stirring time was set to 180 seconds. The above operations were performed by setting the room temperature to 22 degrees Celsius. The temperature of the kneaded product when the kneading started was the same as the room temperature.

Then, the stirred and defoamed kneaded product was removed from the stirring and defoaming device and filled into the storage container by a filling device (Japanese Patent No. 4659128, commercially available from Kaga Sangyo Co., Ltd.). 135 g of the stirred and defoamed kneaded product was filled into one storage container.

The kneaded product filled into the storage container was rapidly frozen at −70 degrees Celsius by a rapid freezing machine.

The storage container containing the rapidly frozen kneaded product was stored at −50 degrees Celsius in a freezer (15 hours).

Comparative Example 3

336 g of manganese dioxide as a main component and 34 g of ethyl acetate as a curing agent were mixed to prepare 370 g of a mixture.

Then, immediately, kneading of the mixture was started. The kneading was performed by a kneading device at a rotational speed of 30 rpm for 10 minutes.

After the kneading, the kneaded product was transferred into a container of a stirring and defoaming device (ARV930TWIN commercially available from Thinky Corporation) and stirred and defoamed. In the stirring and defoaming device, a stirring rotational speed was set to 600 rpm and a stirring time was set to 120 seconds. The above operations were performed by setting the room temperature to 22 degrees Celsius. The temperature of the kneaded product when the kneading started was the same as the room temperature.

Then, the stirred and defoamed kneaded product was removed from the stirring and defoaming device and filled into the storage container by a filling device (Japanese Patent No. 4659128, commercially available from Kaga Sangyo Co., Ltd.). 135 g of the stirred and defoamed kneaded product was filled into one storage container.

The kneaded product filled into the storage container was rapidly frozen at −70 degrees Celsius by a rapid freezing machine.

The storage container containing the rapidly frozen kneaded product was stored at −50 degrees Celsius in a freezer (15 hours).

(Void removal ability)

The sealants (kneaded products) prepared in Examples 1 and 2 and Comparative Examples 1 to 3 were thawed and then applied to test pieces, and cured and then cut, and it was visually checked whether there were voids.

As a result, it was confirmed that voids were removed in Examples 1 and 2 in which an arithmetic product of the stirring rotational speed and the stirring time was in an area from the line L1 to the line L2 in FIG. 4.

On the other hand, in Comparative Example 1 in which an arithmetic product of the stirring rotational speed and the stirring time was in an area below the line L2 in FIG. 4, it was confirmed that voids remained.

In Comparative Example 2 in which an arithmetic product of the stirring rotational speed and the stirring time was in an area above the line L1 in FIG. 4, it was confirmed that voids were removed.

In Comparative Example 3 in which an arithmetic product of the stirring rotational speed and the stirring time was slightly lower than the void removal lower limit value line in FIG. 4, remaining voids were confirmed as in Comparative Example 1.

(Discharging Ability)

For the sealants (kneaded products) prepared in Examples 1 and 2 and Comparative Examples 1 to 3, a discharge amount (weight) per unit time at intervals of 20 minutes to 30 minutes was measured a plurality of times until 120 minutes had passed.

In measurement of the discharge amount, the storage container (in other words, a cartridge) was loaded into a caulking gun with a nozzle diameter of 5 mm and a predetermined pressure was applied to discharge the sealant in the storage container from the tip of the nozzle.

As a result, in Examples 1 and 2 in which an arithmetic product of the stirring rotational speed and the stirring time falls within an area from the line L1 to the line L2 in FIG. 4, it was confirmed that, even after 120 minutes after thawing a sufficient discharge amount (for example, about 8.4 g/10 seconds) was maintained.

On the other hand, in Comparative Example 1 in which an arithmetic product of the stirring rotational speed and the stirring time was in an area below the line L2 in FIG. 4, it was not possible to maintain a sufficient discharge amount until 120 minutes had passed.

In Comparative Example 2 in which an arithmetic product of the stirring rotational speed and the stirring time was in an area above the line L1 in FIG. 4, cases in which a sufficient discharge amount was maintained and cases in which a sufficient discharge amount was not maintained were both confirmed. That is, in Comparative Example 2, it was confirmed that the discharging ability was unstable.

In Comparative Example 3 in which an arithmetic product of the stirring rotational speed and the stirring time was slightly lower than the line L2 in FIG. 4, a sufficient discharge amount was not maintained as in Comparative Example 1.

Table 1 shows the results of checking the void removal ability and the discharging ability.

TABLE 1

|  | Void removal ability | Discharging ability |
|---|---|---|
| Example 1 | Good | Good |
| Example 2 | Good | Good |
| Comparative Example 1 | Very poor | Very poor |
| Comparative Example 2 | Good | Poor |
| Comparative Example 3 | Very poor | Very poor |

As shown in Table 1, it was confirmed that, in Examples 1 and 2, both the void removal ability and the discharging ability were satisfied, and in Comparative Examples 1 to 3, it was not possible to satisfy at least one of the void removal ability and the discharging ability.

The present invention is not limited to the configuration of the embodiment described above and the design can be changed without departing from the spirit and scope of the invention.

For example, the stirring and defoaming device is not limited to the device exemplified in the embodiment.

INDUSTRIAL APPLICABILITY

The present invention can be applied to a method for producing a sealant. According to the present invention, it is possible to improve mass productivity while maintaining a void removal ability and a discharging ability.

REFERENCE SIGNS LIST

S01 Weighing and mixing step
S02 Kneading step
S03 Stirring and defoaming step
S04 Filling step
S05 Freezing step
S06 Storage step

The invention claimed is:

1. A method for producing a sealant, comprising:
a weighing and mixing step in which a main component and a curing agent are weighed out and mixed together;
a kneading step in which the mixture mixed in the weighing and mixing step is kneaded;
a stirring and defoaming step in which the kneaded product kneaded in the kneading step is stirred and defoamed; and
a filling step in which the kneaded product defoamed in the stirring and defoaming step is filled into a container;
wherein the method further comprises a step in which, before the stirring and defoaming step,
each of a plurality of amounts of the kneaded product for evaluation is stirred at one of various stirring rotational speeds for one of various stirring times,
each of the plurality of amounts of the kneaded product for evaluation that has been stirred is evaluated for whether or not voids are removed,
each of the plurality of amounts of the kneaded product for evaluation that has been stirred is discharged from a container to measure a discharge amount per unit time and evaluate whether or not the discharge amount is favorable based on the discharge amount that has been measured, and
an arithmetic product upper limit value that is an upper limit value of an arithmetic product of the stirring rotational speed and the stirring time according to the plurality of amounts of the kneaded product for evaluation when the voids are evaluated as being removed and the discharge amount is evaluated as being favorable is obtained, and
an arithmetic product lower limit value that is a lower limit value of the arithmetic product of the stirring rotational speed and the stirring time according to the plurality of amounts of the kneaded product for evaluation is obtained,
wherein, in the stirring and defoaming step,
the kneaded product is stirred under a condition in which the arithmetic product of a stirring rotational speed at which the kneaded product is stirred and a stirring time for which the kneaded product is stirred is within a range from the arithmetic product lower limit value to the arithmetic product upper limit value that are predetermined according to an amount of the kneaded product to be stirred.

2. The method for producing a sealant according to claim 1,
wherein the arithmetic product lower limit value and the arithmetic product upper limit value are set so that the stirring time is within a range from an upper limit value to a lower limit value of the preset stirring time.

3. The method for producing a sealant according to claim 2, wherein:
the upper limit value of the stirring time is 3 minutes, and
the lower limit value of the stirring time is 0.5 minutes.

4. The method for producing a sealant according to claim 3, wherein:
the amount of the kneaded product to be stirred is 270 g to 370 g,
the stirring rotational speed is 700 rpm, and
the stirring time is 120 seconds.

5. The method for producing a sealant according to claim 3,
wherein, in the stirring and defoaming step, stirring is performed by setting the temperature of the kneaded product kneaded in the weighing and mixing step to 10 degrees to 32 degrees Celsius.

6. The method for producing a sealant according to claim 3, comprising
a freezing step in which the kneaded product filled into the container is frozen.

7. The method for producing a sealant according to claim 2, wherein:
the amount of the kneaded product to be stirred is 270 g to 370 g,
the stirring rotational speed is 700 rpm, and
the stirring time is 120 seconds.

8. The method for producing a sealant according to claim 2,
wherein, in the stirring and defoaming step, stirring is performed by setting the temperature of the kneaded product kneaded in the weighing and mixing step to 10 degrees to 32 degrees Celsius.

9. The method for producing a sealant according to claim 2, comprising
a freezing step in which the kneaded product filled into the container is frozen.

10. The method for producing a sealant according to claim 1, wherein:
the amount of the kneaded product to be stirred is 270 g to 370 g,
the stirring rotational speed is 700 rpm, and
the stirring time is 120 seconds.

11. The method for producing a sealant according to claim 10,
wherein, in the stirring and defoaming step, stirring is performed by setting the temperature of the kneaded product kneaded in the weighing and mixing step to 10 degrees to 32 degrees Celsius.

12. The method for producing a sealant according to claim 10, comprising
a freezing step in which the kneaded product filled into the container is frozen.

13. The method for producing a sealant according to claim 1,
wherein, in the stirring and defoaming step, stirring is performed by setting the temperature of the kneaded product kneaded in the weighing and mixing step to 10 degrees to 32 degrees Celsius.

14. The method for producing a sealant according to claim 13, comprising
a freezing step in which the kneaded product filled into the container is frozen.

15. The method for producing a sealant according to claim 1, comprising
a freezing step in which the kneaded product filled into the container is frozen.

* * * * *